US011593399B2

(12) United States Patent
Xiang et al.

(10) Patent No.: US 11,593,399 B2
(45) Date of Patent: Feb. 28, 2023

(54) SYSTEM AND METHOD FOR MANAGING B TREE NODE SHARING USING OPERATION SEQUENCE NUMBERS

(71) Applicant: VMware, Inc., Palo Alto, CA (US)

(72) Inventors: Enning Xiang, San Jose, CA (US); Wenguang Wang, Santa Clara, CA (US); Pranay Singh, San Ramon, CA (US); Subhradyuti Sarkar, Newark, CA (US); Nitin Rastogi, San Bruno, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/355,125

(22) Filed: Jun. 22, 2021

(65) Prior Publication Data
US 2022/0405305 A1   Dec. 22, 2022

(51) Int. Cl.
*G06F 16/27* (2019.01)
*G06F 16/22* (2019.01)
*G06F 16/11* (2019.01)

(52) U.S. Cl.
CPC ........ *G06F 16/273* (2019.01); *G06F 16/128* (2019.01); *G06F 16/2246* (2019.01)

(58) Field of Classification Search
CPC ........ G06F 16/11; G06F 16/128; G06F 16/13; G06F 16/273; G06F 16/2246
See application file for complete search history.

(56) References Cited

U.S. PATENT DOCUMENTS

| 2008/0183973 | A1* | 7/2008 | Aguilera | G06F 11/2094 |
| | | | | 711/E12.066 |
| 2014/0040199 | A1* | 2/2014 | Golab | G06F 16/211 |
| | | | | 707/634 |
| 2017/0357659 | A1* | 12/2017 | MacKovitch | G06F 11/1446 |

* cited by examiner

*Primary Examiner* — James E Richardson
(74) *Attorney, Agent, or Firm* — Loza & Loza, LLP

(57) ABSTRACT

System and method for managing copy-on-write (COW) B tree structures for metadata of storage objects stored in a storage system determine, when a request to modify a target storage object stored in the storage system that requires a modification of a target leaf node in a B tree structure for metadata of the target storage object is received, whether an operation sequence number of the target leaf node is greater than a snapshot sequence number of a parent snapshot of a running point of the B tree structure. When the operation sequence number is greater than the snapshot sequence number, the target leaf mode is modified in place without copying the target leaf node. When the operation sequence number is not greater than the snapshot sequence number, the target leaf node is copied as a new leaf node for the B tree structure and the new leaf node is modified.

20 Claims, 11 Drawing Sheets

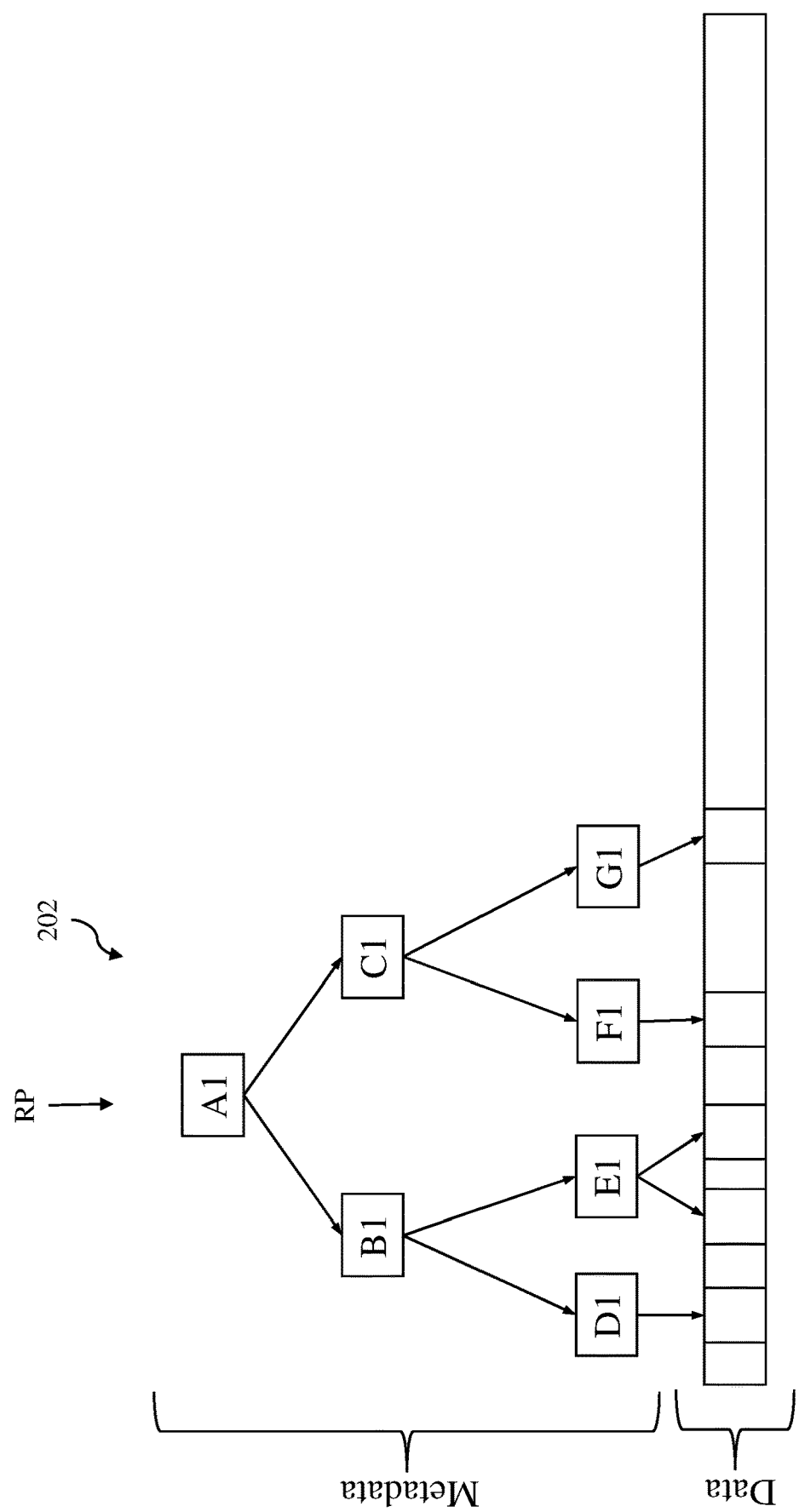

SYSTEM AND METHOD FOR MANAGING B TREE NODE SHARING USING OPERATION SEQUENCE NUMBERS

BACKGROUND

Snapshot technology is commonly used to preserve point-in-time (PIT) state and data of a virtual computing instance (VCI), such as a virtual machine. Snapshots of VCIs are used for various applications, such as VCI replication, VCI rollback and data protection for backup and recovery.

Current snapshot technology can be classified into two types of snapshot techniques. The first type of snapshot techniques includes redo-log based snapshot techniques, which involve maintaining changes for each snapshot in separate redo logs. A concern with this approach is that the snapshot technique cannot be scaled to manage a large number of snapshots, for example, hundreds of snapshots. In addition, this approach requires intensive computations to consolidate across different snapshots.

The second type of snapshot techniques includes tree-based snapshot techniques, which involve creating a chain or series of snapshots to maintain changes to the underlying data using a B tree structure, such as a B+ tree structure. Significant advantage of the tree-based snapshot techniques over the redo-log based snapshot techniques is the scalability of the tree-based snapshot techniques. However, the snapshot structure of the tree-based snapshot techniques may include many nodes that are shared by multiple snapshots, which need to be efficiently managed. The overhead to maintain node sharing can significantly increase the metadata cost to service client read or write requests, which may negatively impact the system performance for the client requests.

BRIEF DESCRIPTION OF THE DRAWINGS

FIGS. 2A-2C illustrate a copy-on-write (COW) B+ tree structure for metadata of one storage object managed by a host computer in the distributed storage system of FIG. 1 in accordance with an embodiment of the invention.

Throughout the description, similar reference numbers may be used to identify similar elements.

DETAILED DESCRIPTION

Figure 1:
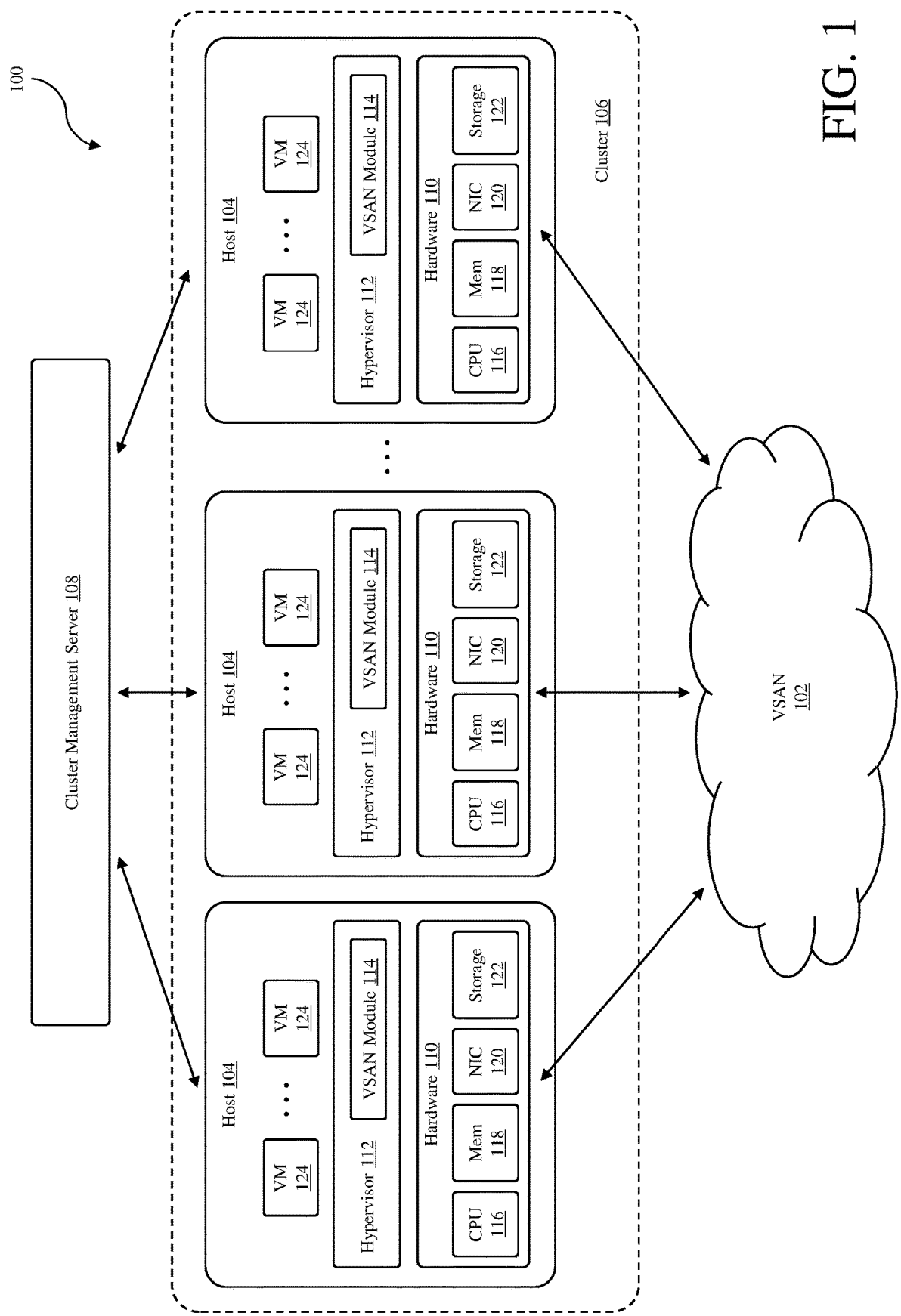
FIG. 1 is a block diagram of a distributed storage system in accordance with an embodiment of the invention.

FIG. 1 illustrates a distributed storage system 100 with a storage system 102 in accordance with an embodiment of the invention. In the illustrated embodiment, the storage system 102 is implemented in the form of a software-based "virtual storage area network" (VSAN) that leverages local storage resources of host computers 104, which are part of a logically defined cluster 106 of host computers that is managed by a cluster management server 108 in the distributed storage system 100. The VSAN 102 allows local storage resources of the host computers 104 to be aggregated to form a shared pool of storage resources, which allows the host computers 104, including any virtual computing instances (VCIs) running on the host computers, to use the shared storage resources. In particular, the VSAN 102 may be used to store series of snapshots for files in an efficient manner, as described herein.

As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, Calif. A virtual container is a package that relies on virtual isolation to deploy and run applications that access a shared operating system (OS) kernel. An example of a virtual container is the virtual container created using a Docker engine made available by Docker, Inc. In this disclosure, the virtual computing instances will be described as being virtual machines, although embodiments of the invention described herein are not limited to virtual machines (VMs).

The cluster management server 108 of the distributed storage system 100 operates to manage and monitor the cluster 106 of host computers 104. The cluster management server 108 may be configured to allow an administrator to create the cluster 106, add host computers to the cluster and delete host computers from the cluster. The cluster management server 108 may also be configured to allow an administrator to change settings or parameters of the host computers in the cluster regarding the VSAN 102, which is formed using the local storage resources of the host computers in the cluster. The cluster management server 108 may further be configured to monitor the current configurations of the host computers and any VCIs running on the host computers, for example, VMs. The monitored configurations may include hardware configuration of each of the host computers and software configurations of each of the host computers. The monitored configurations may also include VCI hosting information, i.e., which VCIs (e.g., VMs) are hosted or running on which host computers. The monitored configurations may also include information regarding the VCIs running on the different host computers in the cluster.

The cluster management server 108 may also perform operations to manage the VCIs and the host computers 104 in the cluster 106. As an example, the cluster management server 108 may be configured to perform various resource management operations for the cluster, including VCI placement operations for either initial placement of VCIs and/or load balancing. The process for initial placement of VCIs, such as VMs, may involve selecting suitable host computers for placement of the virtual instances based on, for example, memory and central processing unit (CPU) requirements of the VCIs, the current memory and CPU loads on all the host computers in the cluster, and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more VCIs, which may be hosted on any host computers. In an implementation, the cluster management server is a VMware vCenter™ server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a CPU commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a magnetic disk.

The hypervisor 112 of each host computer 104, which is a software interface layer, enables sharing of the hardware resources of the host computer by VMs 124, running on the host computer using virtualization technology. With the support of the hypervisor 112, the VMs provide isolated execution spaces for guest software. In other embodiments, the hypervisor may be replaced with an appropriate virtualization software to support a different type of VCIs.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition, the VSAN module generates and manages snapshots of files, such as virtual disk files of the VMs in an efficient manner.

Figure 2B:
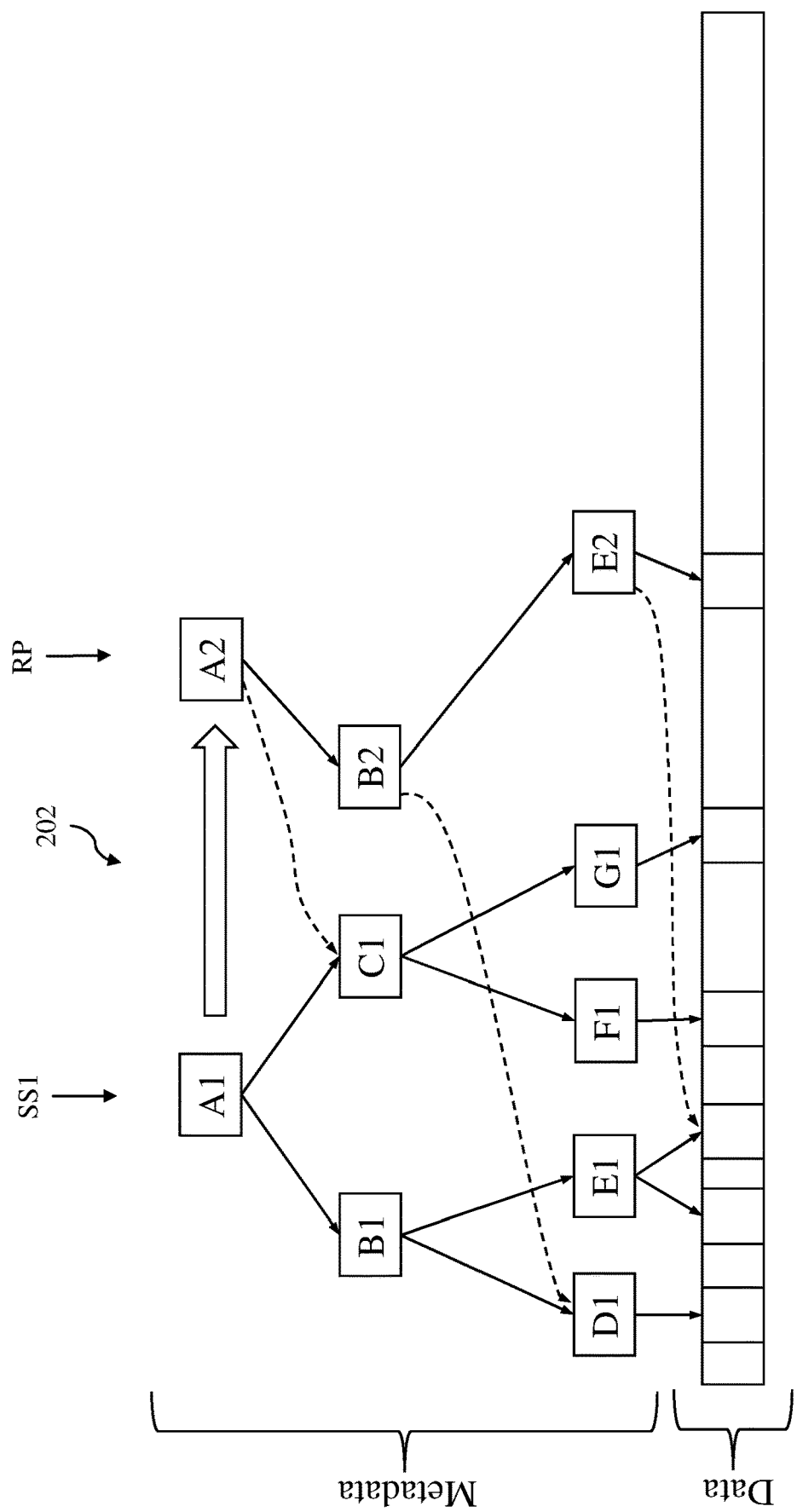
Figure 2C:
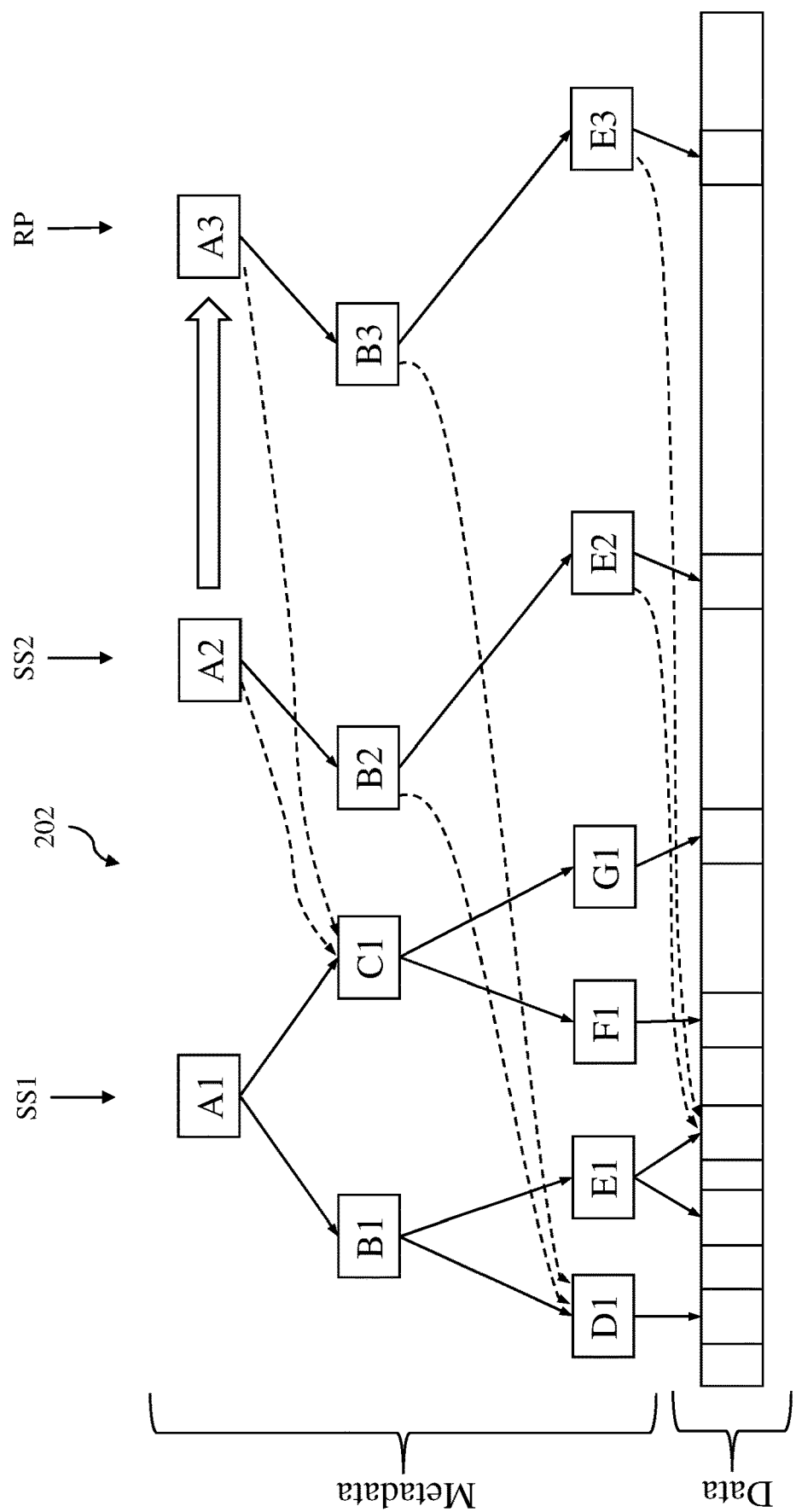

The VSAN module 114 leverages B tree structures, such as copy-on-write (COW) B+ tree structures, to organize storage objects and their snapshots taken at different times. An example of a COW B+ tree structure for one storage object managed by the VSAN module 114 in accordance with an embodiment of the invention is illustrated in FIGS. 2A-2C. In this embodiment, the storage object includes data, which is the actual data of the storage object, and metadata, which is information regarding the COW B+ tree structure used to store the actual data in the VSAN 102.

FIG. 2A shows the storage object before any snapshots of the storage object were taken. The storage object comprises data, which is stored in data blocks in the VSAN 102, as defined by a COW B+ tree structure 202. Currently, the B+ tree structure 202 includes nodes A1-G1, which define one tree of the B+ tree structure (or one sub-tree if the entire B+ tree structure is viewed as being a single tree). The node A1 is the root node of the tree. The nodes B1 and C1 are index nodes of the tree. The nodes D1-G1 are leaf nodes of the tree, which are nodes on the bottom layer of the tree. As snapshots of the storage object are created, more root, index and leaf nodes, and thus, more trees may be created. Each root node contains references that point to index nodes. Each index node contains references that point to other nodes. Each leaf node records the mapping from logic block address (LBA) to the physical location or address in the storage system. Each node in the B+ tree structure may include a node header and a number of references or entries. The node header may include information regarding that particular node, such as an identification (ID) of the node and an operation sequence number (SN), which is sometimes referred to herein simply as "SN". SN is a transaction ID that is stamped on each node for each operation on the B+ tree structure. In some embodiments, SN is monotonically increased, for example, by a constant value of one (1), as new transactions or operations are executed on the B+ tree structure. Each entry in the leaf nodes may include an LBA, physical extent location, checksum and other characteristics of the data for this entry. In FIG. 2A, the entire B+ tree structure 202 can be viewed as the current state or running point (RP) of the storage object. Thus, the nodes A1-G1 are exclusive owned by the running point and are modifiable.

FIG. 2B shows the storage object after a first snapshot SS1 of the storage object was taken. Once the first snapshot SS1 is created or taken, all the nodes in the B+ tree structure 202 become immutable (i.e., cannot be modified). In FIG. 2B, the nodes A1-G1 have become immutable, preserving the storage object to a point in time when the first snapshot SS1 was taken. Thus, the tree with the nodes A1-G1 can be viewed as the first snapshot SS1. In some embodiments, each snapshot of a storage object may include a snapshot generation ID and data regarding all the nodes in the B+ tree structure for that snapshot, e.g., the nodes A1-G1 of the B+ tree structure 202 for the first snapshot SS1 in the example shown in FIG. 2B. In an embodiment, the snapshot generation ID is a snapshot SN (referred to herein as "snapSN"), which is generated as new snapshots are created. In some implementations, the snapSN for a snapshot is set to the latest SN (i.e., the latest SN of the system) minus one (1). In an embodiment, the snapSN of a snapshot may be stamped or included in the root node of the snapshot, e.g., the root node A1 of the B+ tree structure 202 for the first snapshot SS1 in the example shown in FIG. 2B.

When a modification of the storage object is made, after the first snapshot SS1 is created, a new root node and one or more index and leaf nodes are created. In FIG. 2B, new nodes A2, B2 and E2 have been created after the first snapshot SS1 was taken, which now define the running point of the storage object. Thus, the nodes A2, B2 and E2, as well as the nodes C1, D1, F1 and G1, which are common nodes for both the first snapshot SS1 and the current running point, represent the current state of the storage object.

FIG. 2C shows the storage object after a second snapshot SS2 of the storage object was taken. As noted above, once a snapshot is created or taken, all the nodes in the B+ tree structure become immutable. Thus, in FIG. 2C, the nodes A2, B2 and E2 have become immutable, preserving the storage object to a point in time when the second snapshot SS2 was taken. Thus, the tree with the nodes A2, B2, E2, C1, D1, F1 and G1 can be viewed as the second snapshot. In an embodiment, any snapshot of a storage object after the first snapshot includes a snapshot generation identification, such as a snapSN, and data regarding nodes in the B+ tree structure that differ from the previous snapshot of the storage object, e.g., the nodes A2, B2 and E2 in the example shown in FIG. 2C. When a modification of the storage object is made after the second snapshot SS2 is created, a new root node and one or more index and leaf nodes are created. In FIG. 2C, new nodes A3, B3 and E3 have been created after the second snapshot was taken. Thus, nodes A3, B3 and E3, as well as the nodes C1, D1, F1 and G1, which are common nodes for both the second snapshot and the current running point, represent the current state of the storage object.

Figure 3:
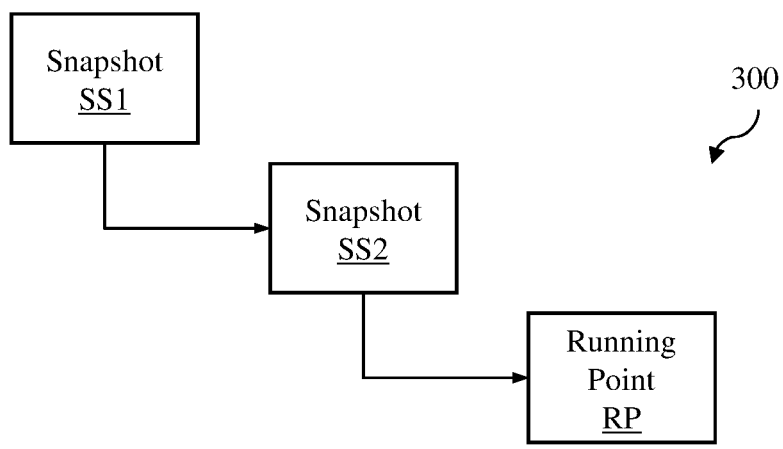
FIG. 3 illustrates a hierarchy of snapshots for a storage object in accordance with an embodiment of the invention.

In this manner, multiple snapshots of a storage object can be created at different times. These multiple snapshots create a hierarchy of snapshots. FIG. 3 illustrates a hierarchy 300 of snapshots for the example described above with respect to FIGS. 2A-2C. As shown in FIG. 3, the hierarchy 300 includes a first snapshot SS1, a second snapshot SS2 and the running point RP. The first snapshot SS1 is the parent snapshot of the second snapshot SS2, which is the parent snapshot of the running point RP or the current state. Thus, the snapshot hierarchy 300 illustrates how snapshots of a storage object can be visualized.

As more COW B+ tree snapshots are created for a storage object, e.g., a file, more nodes are shared by the various snapshots. Thus, managing the shared nodes by the different snapshots can be very challenging. In some embodiments, each node of the COW B+ tree snapshots managed by the VSAN module 114 are handled as a memory page, and thus, the terms "node" and "page" are sometimes interchangeably used herein.

One naive approach to manage the node/page sharing is to maintain a reference count in the page header of each page in the COW B+ tree structure. The page is exclusively owned by the running point if its reference count is 1, and for such a page, the system does not need to copy out a new page when an overwrite happens inside the page or under the subtree of the page. In this approach, the reference count needs to bump up every time when the page is referenced by a new snapshot. When an index node is copied out, almost all its children pages will be referenced by the new index node, so the reference counts of these children pages need to be updated, which can trigger F page inputs/outputs (IOs), where F is the average fan-out of the index node. Thus, when an extent is overwritten for the first time in the running point, this event can trigger (N−2)*F page IOs for the reference count update in the worst case scenario, where N is the depth of the COW B+ tree structure from the root node of the running point. This can cause about 1 K page IOs in a six (6) level COW B+ tree structure with 236 average fan-out. Consequently, using this approach, the metadata overhead to maintain the page reference count is too high for a single client write request.

In the distributed storage system 100, each VSAN module 114 in the respective host computer 104 efficiently manages page sharing of the different snapshots of files by taking advantage of the SNs of page operations. In some conventional systems using COW B+ tree structures for snapshots, transaction IDs, similar to the operation SNs, are maintained for the COW B+ tree structures when pages (i.e., nodes of COW B+ tree structures) are created. When a new page is added to a COW B+ tree structure, the latest transaction ID will be stamped into the page header of the new page, and the latest transaction ID of the system will be bumped up correspondingly. So, the transaction ID is monotonically increased and unique for each B+ tree page. Such transaction ID numbering methodology is also used by the VSAN modules 114 in the distributed storage system 100 for nodes of COW B+ tree structures in the form of operation SNs.

As described in detail below, the operation SNs of the pages of the COW B+ tree structures are used in the distributed storage system 100 to manage sharing of pages between the various snapshots to determine when copy-on-write is required. Stamping operation SN in each new page does not cost additional IO, since it is amortized into the cost to create the new page itself. In a typical system using COW B+ tree structures for snapshots, every transaction needs to stamp each B+ tree page header with the transaction ID, such as the operation SN used in the distributed storage system 100. Thus, it is totally free to take advantage of the operation SN from the perspective of addressing the page sharing problem.

In addition to the operation SNs, as explained above with respect to FIG. 2B, for every snapshot, each VSAN module 114 in the respective host computer 104 maintains a per-snapshot snapSN, which is set to the latest operation SN minus a value, such as one (1). In some embodiments, the snapSN is kept in a separate B+ tree structure, in a snapshot table that contains metadata for each snapshot. In some implementations, each active snapshot has a tuple in the snapshot table stored in the B+ tree structure. The schema of the snapshot table is as follows:

Key: snapshot ID
Value: parent snapshot ID, tree root address, snapshot SN, timestamp, etc.

In each of the host computers 104 of the distributed storage system 100, the snapSN of a particular snapshot is initialized when the particular snapshot is created. In some implementations, the snapSN value of a particular snapshot will be set to the latest operation SN minus one (1). Thus, the snapSN of a snapshot is equal to or larger than the operation SN of the last page (the newest page) in the snapshot, but smaller than any page (including the root node page) of any child snapshot of that snapshot. If the running point is considered to be a child snapshot, the snapSN of a particular snapshot is initialized when its first child snapshot is created.

In the distributed storage system 100, whether a new node of a COW B+ tree structure needs to be copied out depends on the sharing status of the original node of the COW B+ tree structure. For example, when an extent is going to insert or overwrite at a particular leaf node, the system needs to figure out whether the leaf node in question can be updated in place or a new leaf node needs to be copied out first from the original leaf node. If the leaf node is exclusively owned by the running point, the system can in-place insert or overwrite the extent at the original leaf node. However, if the leaf node is shared both by the running point and one or more ancestor snapshots, then the system needs to copy out a new leaf node exclusively owned by the running point, and then do the update at the copied new leaf node for the extent operation.

Turning back to FIG. 2A, for the COW B+ tree structure 202 in the illustrated state, the leaf nodes D1-G1 are exclusively owned by the running point and not shared with any ancestor snapshots. Thus, these nodes D1-G1 can be updated without copying out new leaf nodes. Similarly, the index nodes A1-C1 can also be update without copying out new nodes.

In FIG. 2B, the leaf node E2 of the COW B+ tree structure 202 is exclusively owned by the running point and not shared with any ancestor snapshots, e.g., the snapshot SS1. Thus, the leaf node E2 can be updated without copying out a new leaf node.

However, the leaf node D1 is shared by the running point and the snapshot SS1. Thus, in order to revise or modify the leaf node D1, a copy of the leaf node D1 must be made as a new leaf node that is exclusively owned by the running point, which can then be revised or modified.

In FIG. 2C, the leaf node E3 of the COW B+ tree structure 202 is exclusively owned by the running point and not shared with any ancestor snapshots, e.g., the snapshots SS1 and SS2. Thus, the leaf node E3 can be updated without copying out a new leaf node. However, the leaf nodes D1, F1 and G1 are shared by the running point and the snapshots SS1 and SS2. Thus, in order to revise or modify any of these shared leaf nodes, a copy of the original leaf node must be made as a new leaf node that is exclusively owned by the running point, which can then be revised or modified.

In accordance with embodiments of the invention, each VSAN module 114 in the respective host computer 104 of the distributed storage system 100 uses an efficient methodology to determine whether a leaf node of a COW B+ tree structure is shared or not by comparing the operation SN of the original leaf node and the snapSN of the parent snapshot, if the parent snapshot exists. If the operation SN of the leaf node is smaller than or equal to the snapSN of the parent snapshot, the leaf node is shared by at least by the running point and its parent snapshot, since leaf nodes exclusively owned by the running point will always have an operation SN larger than the snapSN of the parent snapshot because the snapSN of a snapshot is set before any leaf node of children snapshots is initialized. In this case, in order to modify the leaf node, the original leaf node must be copied as a new leaf node exclusively owned by the running point, which can then be modified.

However, if the operation SN of the leaf node is larger than the snapSN of the parent snapshot, then the leaf node is exclusively owned by the running point, since the operation SN of any leaf node in the parent snapshot is always smaller than or equal to the snapSN of the parent snapshot. This is also the case if the running point does not have a parent snapshot because all leaf nodes accessible from the root node of the running point are exclusively owned by the running point. In these cases, since the leaf node is exclusively owned by the running point, the leaf node can be modified in place without having to make a copy of the original leaf node and then making the desired modification on the copy of the leaf node.

Thus, in accordance with embodiments of the invention, the methodology for managing shared leaf nodes of COW B+ tree structures for storage objects takes advantage of a unique and monotonically increased operation SN (which is necessary to keep track of transactions) in the header of each new B+ tree leaf node for free without introducing additional cost. As described above, the leaf node sharing status will be simply determined by comparing the stamped operation SN at a particular leaf node and the snapSN of the parent snapshot, if any. Since each snapSN requires a very small amount of data, the snapSN of the parent snapshot of the running point can be easily cached in memory, and the comparison between the operation SN of a target leaf node and the snapSN of the parent snapshot, if any, does not trigger additional IO overhead. In this way, the methodology introduces almost zero IO cost to maintain leaf node sharing status, especially when the sharing status of a leaf node needs to be figured out during an extent update (e.g., insert, delete, or overwrite). As such, the methodology is very competitive compared to conventionally alternative methods from the IO cost perspective for extent update operations.

Figure 4:
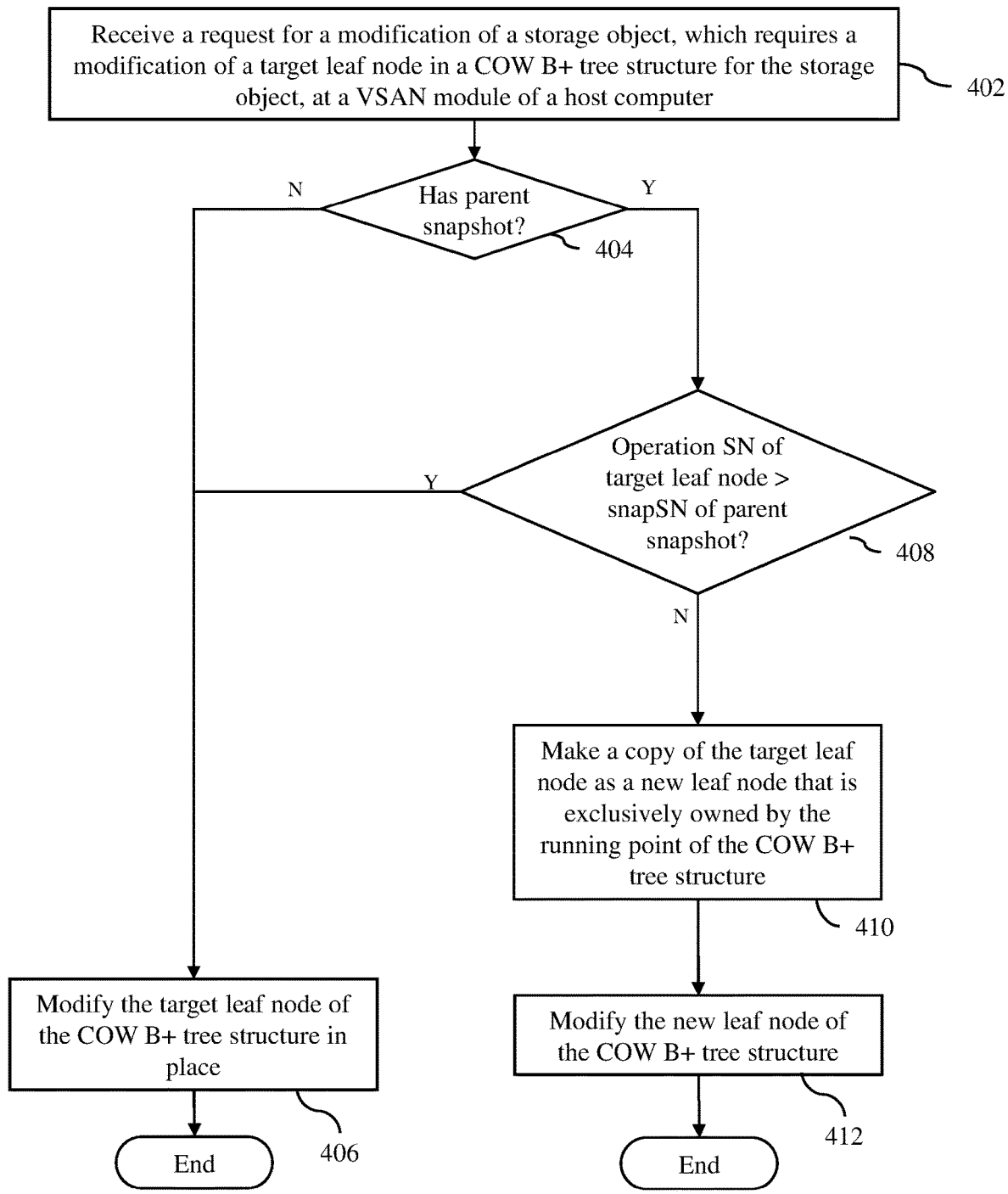
FIG. 4 is a flow diagram of an operation executed by each VSAN module of host computers in the distributed storage system of FIG. 1 to manage shared leaf nodes of a COW B+ tree structure for metadata of a storage object stored in a storage system in accordance with an embodiment of the invention.

An operation executed by each VSAN module 114 of the host computers 104 in the distributed storage system 100 to manage shared leaf nodes of a COW B+ tree structure for metadata of a storage object stored in the storage system 102 in accordance with an embodiment is described with reference to a process flow diagram of FIG. 4. The operation begins at step 402, where a request for a modification of the storage object, which requires a modification of a target leaf node in the COW B+ tree structure, is received at the VSAN module 114. The modification request may have originated from any software process running on the host computer 104, such as one of the VMs 124 running on the host computer or an application running on one of those VMs.

Next, at step 404, a determination is made by the VSAN module 114 whether the running point of the COW B+ tree structure has a parent snapshot. That is, the COW B+ tree structure is checked to see if there is at least one active snapshot in addition to the running point. If there are multiple snapshots, the latest snapshot is the parent snapshot of the target leaf node. In an embodiment, parent-child snapshot information is maintained in a snapshot table, which may be stored in a normal B+ tree structure. Thus, in this embodiment, the snapshot table is checked to determine whether the running point has a parent snapshot.

If the running point does not have a parent snapshot, then the operation proceeds to step 406, where the target leaf node of the COW B+ tree structure is modified in place without copying the target leaf node and then modifying the copy of the target leaf node. The operation then comes to an end.

However, if the running point does have a parent snapshot, then the operation proceeds to step 408, where a determination is made by the VSAN module 114 whether the operation SN of the target leaf node is greater than the snapSN of the parent snapshot. In an embodiment, the snapSN of the parent snapshot may be obtained from a key-value table stored in a separate B+ tree structure associated with the COW B+ tree structure. If the operation SN of the target leaf node is greater than the snapSN of the parent snapshot, the operation proceeds to step 406, where the target leaf node of the COW B+ tree structure is modified in place.

However, if the operation SN of the target leaf node is not greater than the snapSN of the parent snapshot, the operation proceeds to step 410, where a copy of the target leaf node of the COW B+ tree structure is made as a new leaf node of the COW B+ tree structure that is exclusively owned by the running point of the COW B+ tree structure by the VSAN module 114.

Next, at step 412, the new leaf node of the COW B+ tree structure is modified by the VSAN module 114 according to the received modification request. The operation then comes to an end.

Figure 5A:
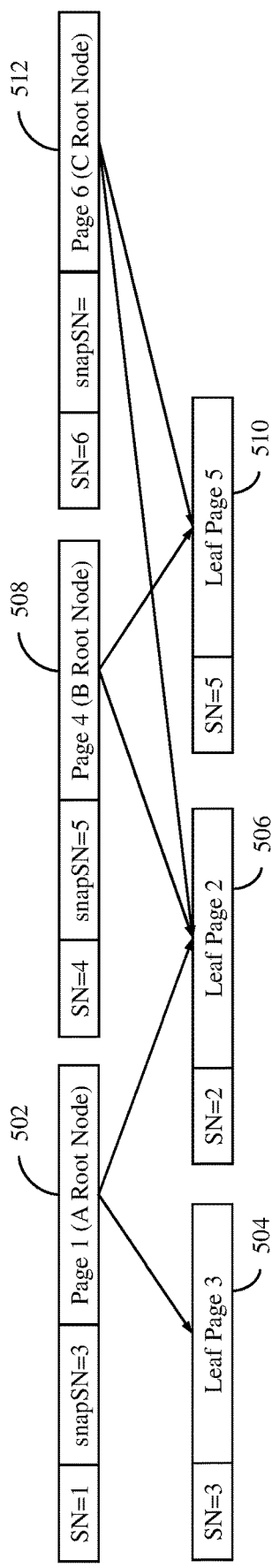
FIGS. 5A-5C illustrate the operation to manage shared leaf nodes of a COW B+ tree structure when a COW is not needed for a target leaf node in accordance with an embodiment.
Figure 5B:
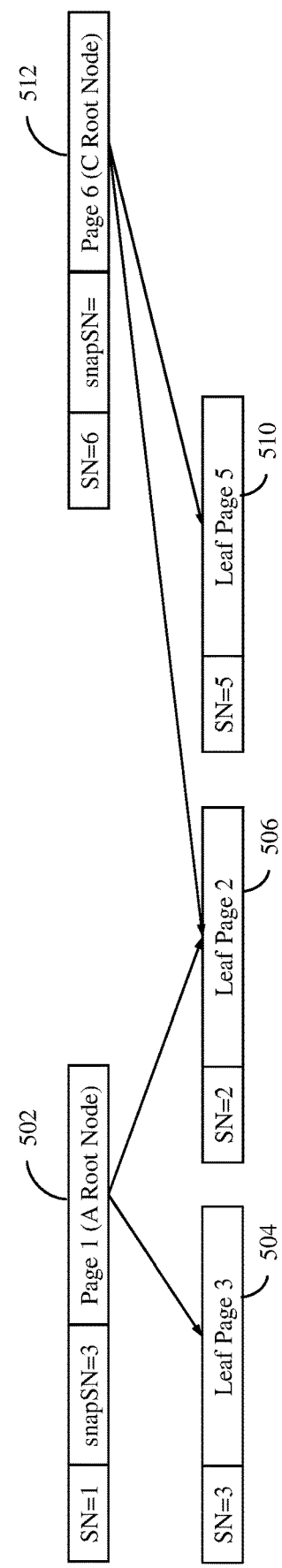
Figure 5C:
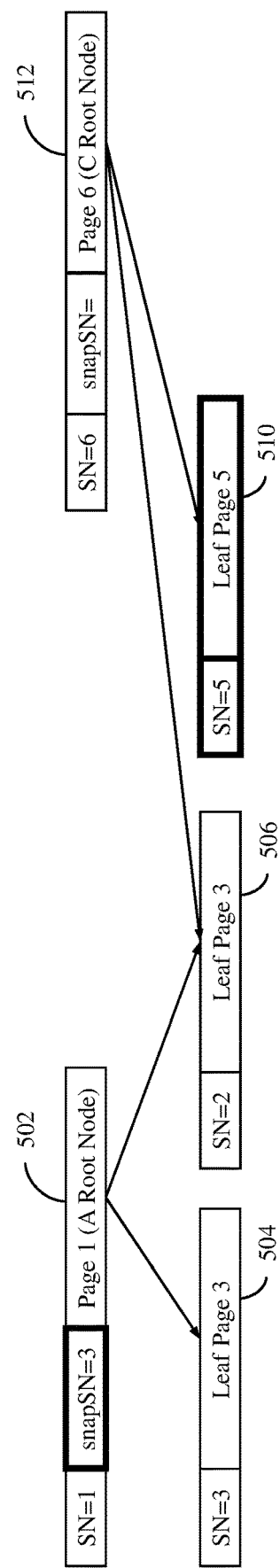

FIGS. 5A-5C illustrate the described operation when a COW is not needed for a target leaf node in accordance with an embodiment of the invention. In this example, as shown in FIG. 5A, there are initially three B+ tree snapshots for a target file, snapshots A, B and C, where each of the nodes of the snapshots is stored as a single page. The snapshot C can be considered to be the running point. The first snapshot A includes a root node 502 and two leaf nodes 504 and 506, the second snapshot B includes a root node 508 and two leaf nodes 506 and 510, and the third snapshot C includes a root node 512 and two leaf nodes 506 and 510. Thus, the leaf node 506 is shared by the first, second and third tree snapshots A, B and C, and the leaf node 510 is shared by the second and third snapshots B and C. The page numbers of the nodes shown in FIG. 5A, which correspond to operation sequential numbers (SNs) of the nodes, illustrate the order in which the nodes were created. The snapshot sequential numbers (snapSNs) of the root nodes, which correspond to snapshot numbers of the root nodes, indicate when the snapshots were created relative to the leaf nodes using the operation SNs of the leaf nodes. In this initial state, the snapshot A is the parent snapshot of the snapshot B, and the snapshot B is the parent snapshot of the snapshot C, which is the running point. Since the snapshot does not have a child snapshot, the snapSN of the snapshot C has not yet been set.

FIG. 5B illustrates the snapshots of the target file after the snapshot B has been deleted. As shown in FIG. 5B, the root node 508 of the snapshot B has been removed. Thus, the snapshot A is now the parent snapshot of the snapshot C. In addition, the leaf node 504 is only referenced by the root node 502 of the snapshot A and the leaf node 510 is only referenced by the root node 512 of the snapshot C. Furthermore, the leaf node 506 is now shared by the first and third snapshots A and C.

FIG. 5C illustrates the snapshots of the target file when the leaf node 510 is to be overwritten. In this scenario, since the operation SN of the leaf node 510 (i.e., SN=5) is greater than the snapSN of the parent snapshot A (i.e., snapSN=3), there is no need to perform a copy-on-write operation to write to the leaf node 510.

Figure 6A:
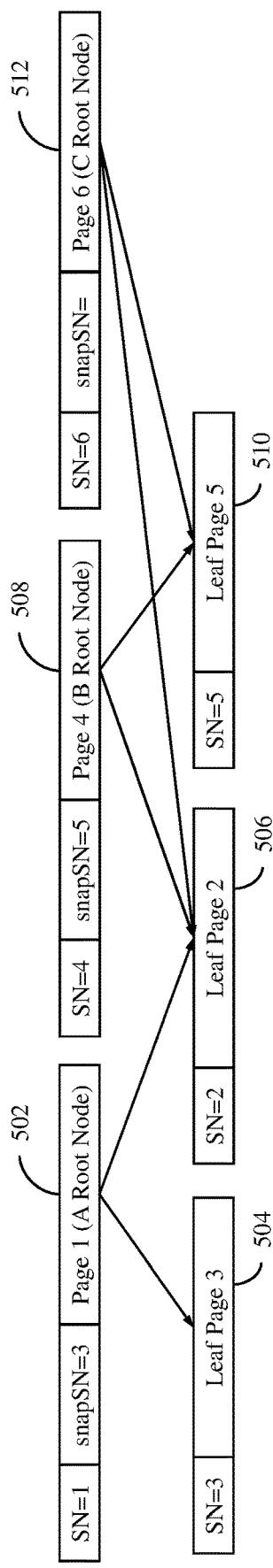
FIGS. 6A and 6B illustrate the operation to manage shared leaf nodes of a COW B+ tree structure when a COW is needed for a target leaf node in accordance with an embodiment.
Figure 6B:
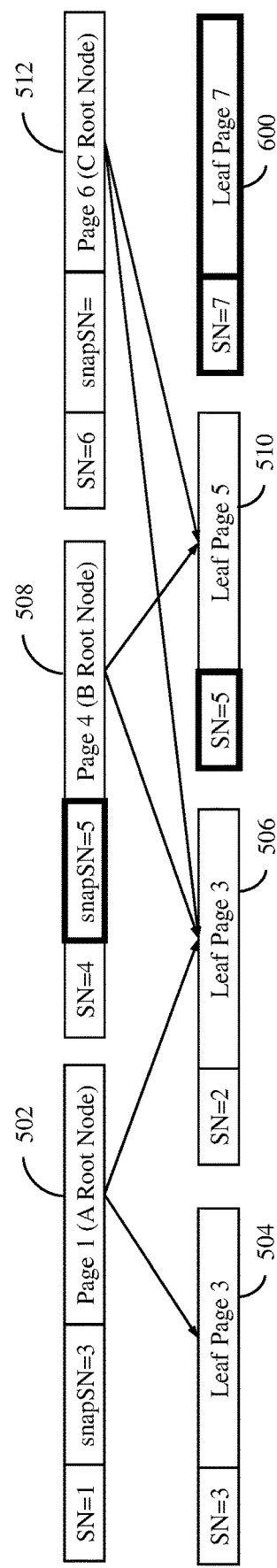

FIGS. 6A and 6B illustrate the operation when a COW is needed for a target leaf node in accordance with an embodiment of the invention. In this example, as shown in FIG. 6A, there are initially three B+ tree snapshots for a target file, snapshots A, B and C, where each of the nodes of the snapshots is stored as a single page. In this initial state, which is same as the initial state depicted in FIG. 5A, the snapshot A is the parent snapshot of the snapshot B, and the snapshot B is the parent snapshot of the snapshot C, which is the running point.

FIG. 6B illustrates the snapshots of the target file after the leaf node 510 is to be overwritten. In this scenario, since the operation SN of the leaf node 510 (i.e., SN=5) is not greater than the snapSN of the parent snapshot B (i.e., snapSN=5), a copy-on-write operation is needed. Thus, as illustrated in FIG. 5B, a new leaf node 600 with SN=7 has been created, which can now be overwritten.

Figure 7:
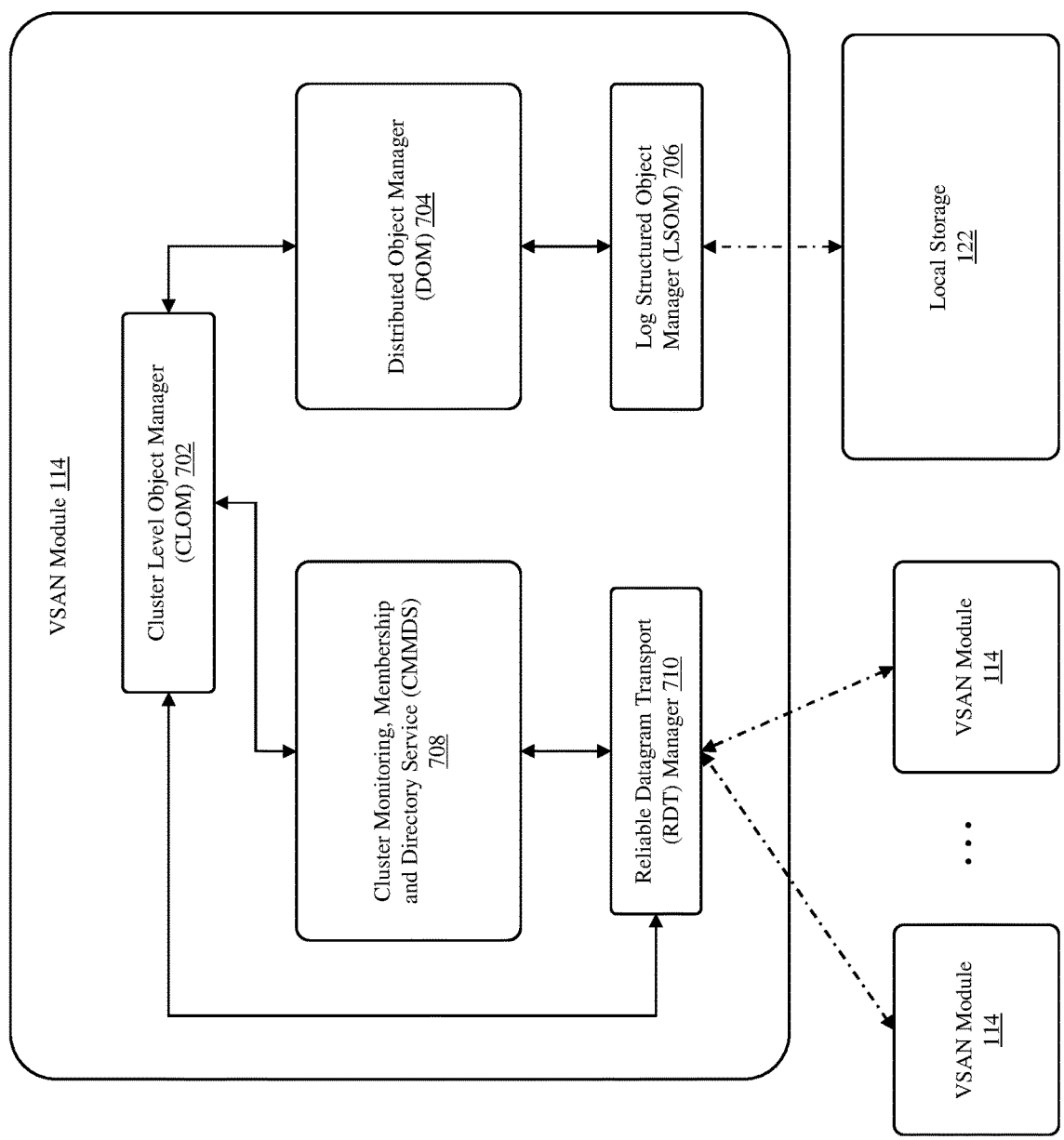
FIG. 7 is a block diagram of components of the VSAN module in accordance with an embodiment of the invention.

Turning now to FIG. 7, components of the VSAN module 114, which is included in each host computer 104 in the cluster 106, in accordance with an embodiment of the invention are shown. As illustrated in FIG. 7, the VSAN module includes a cluster level object manager (CLOM) 702, a distributed object manager (DOM) 704, a local log structured object management (LSOM) 706, a cluster monitoring, membership and directory service (CMMDS) 708, and a reliable datagram transport (RDT) manager 710. These components of the VSAN module may be implemented as software running on each of the host computers in the cluster.

The CLOM 702 operates to validate storage resource availability, and the DOM 704 operates to create components and apply configuration locally through the LSOM 706. The DOM 704 also operates to coordinate with counterparts for component creation on other host computers 104 in the cluster 106. All subsequent reads and writes to storage objects funnel through the DOM 704, which will take them to the appropriate components. The LSOM 706 operates to monitor the flow of storage I/O operations to the local storage 122, for example, to report whether a storage resource is congested. The CMMDS 708 is responsible for monitoring the VSAN cluster's membership, checking heartbeats between the host computers in the cluster, and publishing updates to the cluster directory. Other software components use the cluster directory to learn of changes in cluster topology and object configuration. For example, the DOM uses the contents of the cluster directory to determine the host computers in the cluster storing the components of a storage object and the paths by which those host computers are reachable.

The RDT manager 710 is the communication mechanism for storage-related data or messages in a VSAN network, and thus, can communicate with the VSAN modules 114 in other host computers 104 in the cluster 106. As used herein, storage-related data or messages (simply referred to herein as "messages") may be any pieces of information, which may be in the form of data streams, that are transmitted between the host computers 104 in the cluster 106 to support the operation of the VSAN 102. Thus, storage-related messages may include data being written into the VSAN 102 or data being read from the VSAN 102. In an embodiment, the RDT manager uses the Transmission Control Protocol (TCP) at the transport layer and it is responsible for creating and destroying on demand TCP connections (sockets) to the RDT managers of the VSAN modules in other host computers in the cluster. In other embodiments, the RDT manager may use remote direct memory access (RDMA) connections to communicate with the other RDT managers.

In the illustrated embodiment, the DOM 704 is configured or programmed to perform the operation described above with respect to the flow diagram of FIG. 4. Thus, the DOM 704 determines whether a COW operation is required when a leaf node of a COW B+ tree structure for a target file needs to be modified. However, in other embodiments, another component in each of the host computers 104 in the cluster 106 with or without the VSAN module 114 may be configured or programmed to perform the operation described herein.

Figure 8:
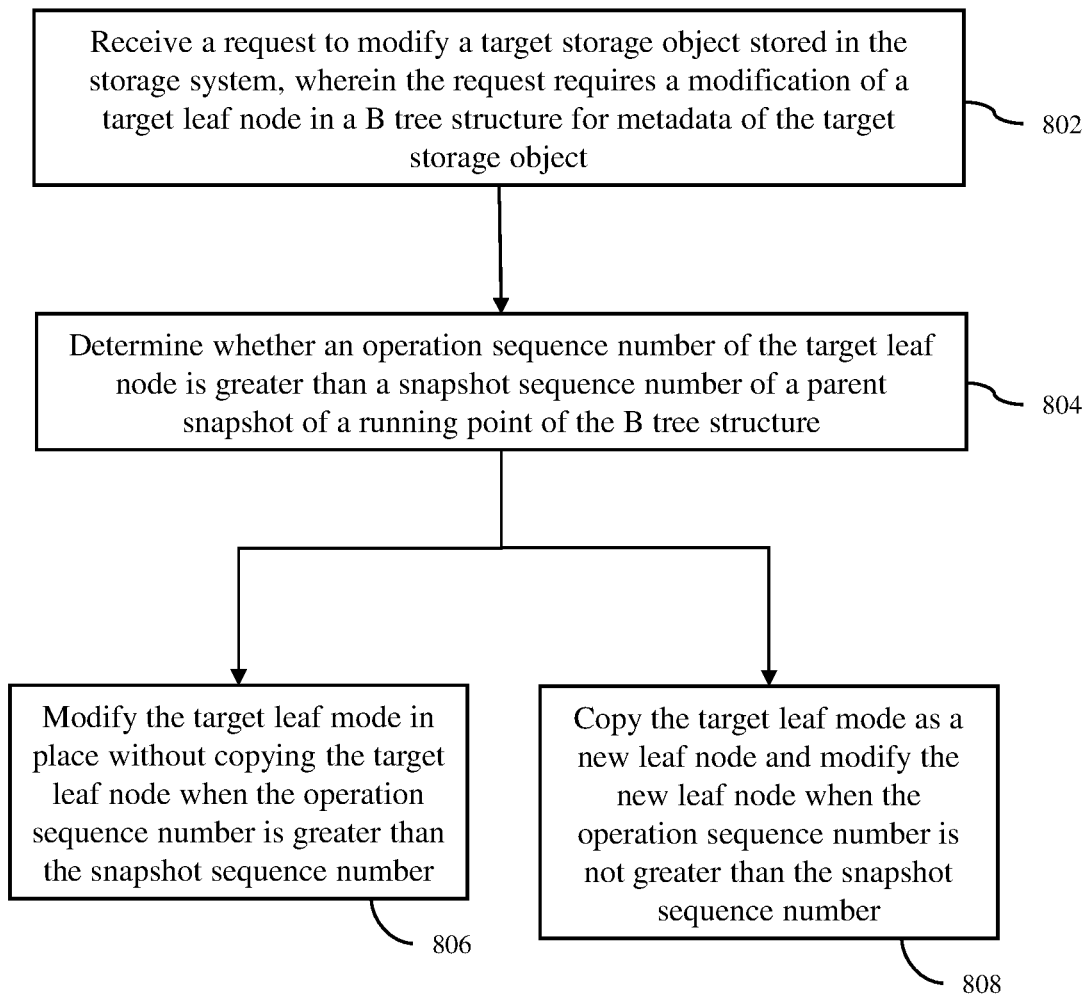
FIG. 8 is a flow diagram of a computer-implemented method for managing B tree structures for metadata of storage objects stored in a storage system in accordance with an embodiment of the invention.

A computer-implemented method for managing B tree structures for metadata of storage objects stored in a storage system in accordance with an embodiment of the invention is described with reference to a flow diagram of FIG. 8. At block 802, a request to modify a target storage object stored in the storage system is received, wherein the request requires a modification of a target leaf node in a B tree structure for metadata of the target storage object, wherein each node of the B tree structure includes a unique operation sequence number, and wherein any snapshot in the B tree structure includes a unique snapshot sequence number. At block 804, a determination is made whether an operation sequence number of the target leaf node is greater than a snapshot sequence number of a parent snapshot of a running point of the B tree structure. At block 806, the target leaf mode of the B tree structure is modified in place without copying the target leaf node when the operation sequence number of the target leaf node is greater than the snapshot sequence number of the parent snapshot. At block 808, the target leaf node of the B tree structure is copied as a new leaf node for the B tree structure and the new leaf node is modified when the operation sequence number of the target leaf node is not greater than the snapshot sequence number of the parent snapshot.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing B tree structures for metadata of storage objects stored in a storage system, the method comprising:
    receiving a request to modify a target storage object stored in the storage system, wherein the request requires a modification of a target leaf node in a B tree structure for metadata of the target storage object, wherein each node of the B tree structure includes a unique operation sequence number, and wherein any snapshot in the B tree structure includes a unique snapshot sequence number;
    determining whether an operation sequence number of the target leaf node is greater than a snapshot sequence number of a parent snapshot of a running point of the B tree structure;
    modifying the target leaf node of the B tree structure in place without copying the target leaf node when the operation sequence number of the target leaf node is greater than the snapshot sequence number of the parent snapshot; and
    copying the target leaf node of the B tree structure as a new leaf node for the B tree structure and modifying the new leaf node when the operation sequence number of the target leaf node is not greater than the snapshot sequence number of the parent snapshot.

2. The method of claim 1, wherein the unique operation sequence number for each node of the B tree structure is a monotonically increased number for each operation on the B tree structure.

3. The method of claim 2, wherein the unique operation sequence number for each node of the B tree structure is increased by a value of one for each operation on the B tree structure.

4. The method of claim 1, wherein the unique snapshot sequence number for any snapshot B tree in the B tree structure is less than a latest unique operation sequence number when that snapshot was taken.

5. The method of claim 4, wherein the unique snapshot sequence number for any snapshot B tree in the B tree structure is the latest unique operation sequence number minus one.

6. The method of claim 1, further comprising maintaining the unique snapshot sequence number of the parent snapshot in another B tree structure.

7. The method of claim 6, wherein the unique snapshot sequence number is stored in a key-value snapshot table in the another B tree structure, and wherein a key of each entry in the key-value snapshot table includes a snapshot identification and a value of each entry in the key-value snapshot table includes at least an associated unique snapshot sequence number and a root node address of an associated snapshot.

8. The method of claim 1, further comprising:
receiving a second request to modify a second target storage object stored in the storage system, wherein the second request requires a modification of a particular leaf node in a second B tree structure for metadata of the second target storage object;
determining whether a parent snapshot exists for the running point of the B tree structure; and
modifying the particular leaf node of the second B tree structure for the metadata of the second storage object stored in the storage system in place without copying the particular leaf node when no parent snapshot exists for the running point.

9. A non-transitory computer-readable storage medium containing program instructions for managing B tree structures for metadata of storage objects stored in a storage system, wherein execution of the program instructions by one or more processors of a computer system causes the one or more processors to perform steps comprising:
receiving a request to modify a target storage object stored in the storage system, wherein the request requires a modification of a target leaf node in a B tree structure for metadata of the target storage object, wherein each node of the B tree structure includes a unique operation sequence number, and wherein any snapshot in the B tree structure includes a unique snapshot sequence number;
determining whether an operation sequence number of the target leaf node is greater than a snapshot sequence number of a parent snapshot of a running point of the B tree structure;
modifying the target leaf node of the B tree structure for the metadata of the storage object stored in the storage system in place without copying the target leaf node when the operation sequence number of the target leaf node is greater than the snapshot sequence number of the parent snapshot; and
copying the target leaf node of the B tree structure for the metadata of the storage object stored in the storage system as a new leaf node for the B tree structure and modifying the new leaf node when the operation sequence number of the target leaf node is not greater than the snapshot sequence number of the parent snapshot.

10. The computer-readable storage medium of claim 9, wherein the unique operation sequence number for each node of the B tree structure is a monotonically increased number for each operation on the B tree structure.

11. The non-transitory computer-readable storage medium of claim 10, wherein the unique operation sequence number for each node of the B tree structure is increased by a value of one for each operation on the B tree structure.

12. The non-transitory computer-readable storage medium of claim 9, wherein the unique snapshot sequence number for any snapshot B tree in the B tree structure is less than a latest unique operation sequence number when that snapshot was taken.

13. The non-transitory computer-readable storage medium of claim 12, wherein the unique snapshot sequence number for any snapshot B tree in the B tree structure is the latest unique operation sequence number minus one.

14. The non-transitory computer-readable storage medium of claim 9, wherein the steps further comprise maintaining the unique snapshot sequence number of the parent snapshot in another B tree structure.

15. The non-transitory computer-readable storage medium of claim 14, wherein the unique snapshot sequence number is stored in a key-value snapshot table in the another B tree structure, and wherein a key of each entry in the key-value snapshot table includes a snapshot identification and a value of each entry in the key-value snapshot table includes at least an associated unique snapshot sequence number and a root node address of an associated snapshot.

16. The non-transitory computer-readable storage medium of claim 9, wherein the steps further comprise:
receiving a second request to modify a second target storage object stored in the storage system, wherein the second request requires a modification of a particular leaf node in a second B tree structure for metadata of the second target storage object;
determining whether a parent snapshot exists for the running point of the B tree structure; and
modifying the particular leaf node of the second B tree structure for the metadata of the second storage object stored in the storage system in place without copying the particular leaf node when no parent snapshot exists for the running point.

17. A computer system comprising:
a storage system having computer data storage devices;
memory; and
at least one processor configured to:
receive a request to modify a target storage object stored in the storage system, wherein the request requires a modification of a target leaf node in a B tree structure for metadata of the target storage object, wherein each node of the B tree structure includes a unique operation sequence number, and wherein any snapshot in the B tree structure includes a unique snapshot sequence number;
determine whether an operation sequence number of the target leaf node is greater than a snapshot sequence number of a parent snapshot of a running point of the B tree structure;
modify the target leaf node of the B tree structure for the metadata of the storage object stored in the storage system in place without copying the target leaf node when the operation sequence number of the target leaf node is greater than the snapshot sequence number of the parent snapshot; and
copy the target leaf node of the B tree structure for the metadata of the storage object stored in the storage system as a new leaf node for the B tree structure and modify the new leaf node when the operation sequence number of the target leaf node is not greater than the snapshot sequence number of the parent snapshot.

18. The computer system of claim 17, wherein the unique operation sequence number for each node of the B tree structure is a monotonically increased number for each operation on the B tree structure.

19. The computer system of claim 17, wherein the unique snapshot sequence number for any snapshot B tree in the B tree structure is less than a latest unique operation sequence number when that snapshot was taken.

20. The computer system of claim 17, wherein the at least one processor is configured to maintain the unique snapshot sequence number of the parent snapshot in another B tree structure.

\* \* \* \* \*